United States Patent Office 3,447,939
Patented June 3, 1969

3,447,939
COMPOUNDS DISSOLVED IN CYCLIC AMINE OXIDES
Dee Lynn Johnson, Rochester, N.Y., assignor to Eastman Kodak Company, Rochester, N.Y., a corporation of New Jersey
No Drawing. Filed Sept. 2, 1966, Ser. No. 576,810
Int. Cl. C09d 3/04, 3/06, 3/08
U.S. Cl. 106—135                          21 Claims

ABSTRACT OF THE DISCLOSURE

Processes for dissolving in a cyclic mono(N-methylamine-N-oxide) compond, compounds such as natural or synthetic polymers. In one aspect, this invention relates to composition comprising compounds dissolved in a cyclic mono(N-methylamine-N-oxide).

---

This invention relates to a process of dissolving a wide range of compounds in saturated, cyclic, amine oxides and the compositions obtained thereby.

Many natural and synthetic compounds, including those having strong intermolecular hydrogen bonding such as wool, silk, hair, feathers, and cellulose, are insoluble in commonly used solvents. Some of these compounds may be dissolved only by using extreme conditions which require high temperatures or highly acidic or basic solvents leading to degradation of the compound. Often, solution results only after several days of treatment. Other compounds remain insoluble even under these drastic conditions. Unless these compounds can be dissolved in an inert and expeditious solvent, chemical and physical modification or improvement of their properties is difficult and sometimes impossible. It has been found that these compounds will readily dissolve in certain saturated, cyclic, amine oxides.

It is an object of this invention to provide solutions of difficultly soluble, natural and synthetic compounds, such as those characterized by intermolecular hydrogen bonding.

Another object is to provide a process for dissolving an extensive variety of natural and synthetic compounds without chemical reaction with or degradation of the compounds.

A further object is to provide a means whereby the chemical and physical properties of various compounds may be modified by chemical reactions which are facilitated by solution or partial solution.

Still another object is to convert natural and synthetic compounds heretofore unused into a composition from which new and unusual fibers may be spun or films may be cast.

Further objects will become apparent from the following specification and claims.

According to my invention, it has been found that a very great many natural synthetic compounds may be dissolved in saturated, cyclic mono(N-methylamine-N-oxides). The amine oxides have the following formula:

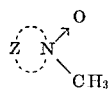

where Z represents the atoms required to complete a saturated heterocyclic ring. The compound can be present in the composition in an amount of up to about 70% by weight of the solution. Among the preferred cyclic mono (N-methylamine-N-oxide) compounds conforming to the above formula are N-methylmorpholine-N-oxide, N-methylpiperidine-N-oxide, N-methylpyrrolidine-N-oxide, and N-methylazacycloheptane-N-oxide.

According to my invention, compounds are defined as any material which is formed by the union or mixture of the elements. Especially important compounds which can be dissolved by the process of my invention are those characterized by intermolecular hydrogen bonding, including natural or synthetic polymers such as wool, silk, hair, feathers, β-amylose, casein, zein, gelatin, gum arabic, lignin, or nylon.

Hydrogen bonding is a well-known term in chemistry and refers to an interaction involving two functional groups in the same molecule or in different molecules. One of these functional groups must serve as a proton donor (an acidic group) and the other as an electron donor (a basic group). The proton is most commonly contributed by a carboxyl, hydroxyl, amine, or amide group or may be a proton attached to a halogen atom, especially fluorine. The functional groups which usually contribute the electrons include the oxygen atom in carbonyls, ethers, and hydroxyls, the nitrogen atom in amines and N-heterocyclic compounds, and halogen atoms in particular molecular environments. A hydrogen bond can be generally defined as an interaction between the functional group A—H and an atom or group of atoms B in the same or different molecule when there is evidence of bond formation in which this new bond linking A—H to B is through the H. A and B usually come from the group of elements N, O, and F. Evidence of this type of bond is usually obtained from molecular weight determinations or from spectroscopic determinations. Compounds containing intermolecular hydrogen bonding as compared to compounds lacking this hydrogen bonding exhibit different physical properties such as higher freezing and boiling points, changed dielectric properties, higher viscosity, modified electronic spectra, and different solubility characteristics. A further discussion of hydrogen bonding may be found in Pimentel and McClellan, The Hydrogen Bond, W. H. Freeman & Co., San Francisco, 1960.

A large number of natural organic compounds, both polymeric and monomeric, are insoluble in common solvents because of their high degree of intermolecular hydrogen bonding. Due to the presence of these polar bonds, most non-polar solvents are incapable of solvating these bonds to the extent necessary for the solution of the compound. Most polar solvents are not effective either since they cannot solvate the organic or non-polar bonded parts of the molecule. Since most of these natural organic compounds have high molecular weight, patrial solvation generally leads to no solution at all. Although I do not wish to be bound by any particular theory, it is theorized that the amine oxides of my invention succeed in effecting solution because their steric characteristics allow the polar or oxide end of the solvent molecule to solvate the polar hydrogen bonds of the compound while the rest of the solvent molecule can solvate the organic or non-polar bonds. Thus, complete solvation and consequent solution can take place.

The cyclic amine oxides of my invention may be prepared by reacting the appropriate saturated tertiary amine with hydrogen peroxide in water. Thus, N-methylmorpholine-N-oxide may be prepared by reacting N-methylmorpholine with hydrogen peroxide in water to give a high yield of the amine oxide.

It is known in the prior art that certain tertiary amine oxides may be used as polymer solvents. For example, U.S. Patent No. 3,185,657 of Balitrand et al., granted May 25, 1965, describes the use of unsaturated amine N-oxides, such as those of pyridine, the picolines, and the lutidines, as solvents for the limited class of homo- and copolymers of acrylonitrile. The saturated amine oxides of my invention, however, will dissolve a much greater number of compounds, both natural and synthetic, both polymeric and monomeric.

U.S. Patent No. 2,179,181 of Graenacher et al., granted Nov. 7, 1939, indicates that oxides of tertiary amines including heterocyclic amines will dissolve cellulose. However, it has been found that triethylamine oxide, N-ethylmorpholine - N - oxide, N,N' - dimethylpiperazine - N,N'-dioxide, 1,4 - diazabicyclo[2.2.2]octane - 1,4-dioxide and their disclosure, are not solvents for cellulose, while the class of compounds specifically described in this invention which includes N-methylmorpholine-N-oxide, N-methylpiperidine-N-oxide, N - methyl-pyrrolidine-N-oxide and N-methylazacycloheptane-N-oxide was unexpectedly found to dissolve cellulose. This is illustrated in Example 10 below.

In U.S. Patent No. 3,239,535 of Searles, granted Mar. 8, 1966, the use of oxides of tertiary amines as curing agents for epoxy materials is disclosed. In this patent, however, the amine oxide is dissolved in the liquid resin and undergoes a chemical reaction with it. In addition, the concentration of the amine oxide does not exceed 10% by weight based on the weight of the epoxy resin. Thus, the use of the amine oxides of the invention to effect solution of natural and synthetic compounds as shown above is not disclosed.

The use of the saturated, cyclic, amine oxides described in this invention avoids many problems inherent in using other types of solvents. Some of the compounds which dissolve readily in these amine oxides are insoluble in other solvents. Other compounds are soluble only in very acidic or very basic media, or only after heating to high temperatures resulting in degradation of the dissolved compound. Because of the inert nature and neutral pH of the amine oxides of this invention and the low temperatures needed to effect solution, the dissolved compound is neither degraded nor reacted with chemically. This is reflected in the high viscosity of solutions of compounds dissolved in the amine oxides of the invention.

Another advantage of this invention is that the amine oxides herein described are themselves soluble in most common solvents, such as water, methanol, acetonitrile, and dimethyl sulfoxide. Thus, by the use of common solvents, the amine oxides can easily be removed from fibers or films made from solutions of various compounds in the amine oxides. In addition, these solutions can also be diluted by a suitably chosen diluent, such as dimethyl sulfoxide, sulfolane, 1,4-oxathiane-4-oxide, or N-methylpyrrolidone, to control viscosity. Further, the use of diluents will facilitate chemical reactions involving the dissolved compounds.

Due to the milder conditions necessary to dissolve compounds using the amine oxides of the invention, more control can be maintained over chemical reactions involving the compounds and the products obtained therefrom. For example, cellulose can be monoacetylated in one step in an amine oxide solution instead of the procedure heretofore used involving two steps of complete acetylation followed by hydrolysis to the desired monoacetate.

The ability to dissolve many compounds, heretofore soluble only with prohibitive difficulty, provides many new uses for these compounds. The ease with which chemical reactions take place in solution leads to new and different compounds with improved properties. For example, when cellulose is dissolved in an amine oxide of the invention, it reacts with ethylene diacetate, isopropenyl acetate, or methoxyethyl acetate to give cellulose acetate, with vinyl butyrate or methyl butyrate to give cellulose butyrate, and with other esters to give the corresponding cellulose esters. In solution, cellulose also reacts with acrylonitrile to give cyanoethyl cellulose, with acrylamide to give cellulose oxyethylformamide, with methyl vinyl ketone to give cellulose oxyethylmethylketone, and with other $\alpha,\beta$-unsaturated compounds to give the corresponding cellulose ethers. Similarly, cellulose dissolved in an amine oxide of the invention reacts with ethylene oxide to give hydroxyethyl cellulose and with ethylene sulfide to give mercaptoethyl cellulose. Compounds such as silk, nylon, wool, or cotton also can be modified to give better fibers for correspondingly better fabrics. Solutions of other compounds are used to create new kinds of fibers or to make molded articles out of unusual materials.

The amine oxides of the invention can be used to dissolve the surface of a material. The solution thus formed on the surface serves as an adhesive to bond a similar or different material also treated with the amine oxide to it. In this manner, non-woven fabrics are produced. Further, other materials can be physically incorporated into the surface solution, or chemical reactions performed within it, to give the surface of a material new and desirable characteristics. For example, strength stiffness and wrinkle resistance are imparted to fabrics by partially acetylating or cyanoethylating its surface.

The following examples will illustrate the invention but are not to be construed to limit it in any way.

Example 1.—Preparation of N-methylmorpholine-N-oxide

In a 22-liter flask fitted with a glass stirrer and dropping funnel and set on an open steam bath were placed 6050 grams of N-methylmorpholine and 500 ml. of water. The solution was heated to 67° C. and over a 4–5 hour period, 4850 grams of 35% hydrogen peroxide was added. A temperature range of 67–72° C. was carefully maintained. When the addition was complete, a temperature of 67–72° was still maintained for two hours with continued stirring. After cooling to room temperature overnight, the excess peroxide was destroyed by adding 10 grams of catalase enzyme and stirring for two hours. When the potassium iodide test for peroxide was negative, the yellow oil was divided into two portions. Each of the portions was placed in a separate 12-liter flask fitted with a stirrer and ester head, and 3 liters of benzene were added. A benzene-water azeotrope was removed until a sample of N-methylmorpholine-N-oxide which had a melting point of 74–76° C. could be obtained. The hot oil was then separated from the benzene and drowned in 10 liters of acetone. Filtration gave a solid which was dried under vacuum. The yield was 6280 grams of N-methylmorpholine-N-oxide, which melted at 74–76° C.

Example 2.—Preparation of N-methylpyrrolidine-N-oxide

In a 12-liter flask fitted with a mechanical stirrer and dropping funnel were placed 1430 grams of N-methylpyrrolidine and 300 ml. of water. Over a 2½ hour period, 1611 grams of 35% hydrogen peroxide was added dropwise. A temperature range of 65–71° C. was maintained during the addition, with external cooling. When the addition was complete, and the reaction no longer generated heat, the mixture was allowed to cool to room temperature and was stirred slowly for three days. The reaction mixture was then diluted with 1.5 liters of water and filtered. The excess peroxide was destroyed by adding catalase enzyme in 2 ml. portions until the solution gave a negative peroxide test with potassium iodide. Water was removed with an aspirator to concentrate the reaction mixture while heating on a 55–60° C. water bath and stirring with a vacuum sealed stirrer overnight. One liter of acetonitrile was added, the mixture was stirred at 55–60° C. and the solvent was removed with an aspirator. Another liter of acetonitrile was added, and the same procedure followed. The yield was 1900 grams of hydrated N-methylpyrrolidine-N-oxide, which had a refractive index of $n_D^{23.5}$ 1.4768.

Example 3.—Preparation N-methylpiperidine-N-oxide

Following the procedure of Example 2, 1180 grams of N-methylpiperidine in 250 ml. of water was reacted with 1072 grams of 35% hydrogen peroxide. The yield was 1445 grams of hydrated N-methylpiperidine-N-oxide, which had a refractive index of $n_D^{20}$ 1.4850.

Example 4.—Preparation of N-methylaza-
cycloheptane-N-oxide

In a 12-liter flask fitted with a mechanical stirrer and dropping funnel were placed 925 grams of N-methylazacycloheptane and 250 ml. of water. The solution was heated to 65° and over a 2½ hour period, 700 grams of 35% hydrogen peroxide was added dropwise. A temperature range of 65–72° C. was maintained during the addition. When the addition was complete, the reaction mixture was stirred for four days at room temperature. The small amount of oil (starting material) which had not reacted was extracted with 1 liter of benzene. The excess peroxide was destroyed by adding catalase enzyme in 2 ml. portions until the water-product solution gave a negative peroxide test with potassium iodide. Water was removed with an aspirator to concentrate the reaction mixture while heating on a 55–60° C. water bath and stirring for one hour with a vacuum sealed stirrer. The oil which remained was then stirred vigorously with 600 ml. of 2,2-dimethoxypropane while heating to a slow boil. The layers were separated and the product was filtered through Celite to take out a small amount of slimy insolubles. The oil was then again concentrated for two hours with an aspirator. The yield was 1090 grams of dark amber oil having a refractive index of $n_D^{25}$ 1.4755.

Example 5.—Solution of long fiber cotton

Into a 500 ml. round-bottomed flask equipped with a Teflon stirring paddle was placed 242.5 grams of N-methyl-morpholine-N-oxide. This flask was immersed in an oil bath thermostated at 90° C., and the amine oxide was stirred about ten minutes until it was melted. While the stirring was continued, 7.5 grams of long fiber engravers cotton was added and complete solution accurred in less than five minutes.

Example 6.—Solution of cotton fabric

A three-gram-piece of 100 percent cotton fabric was cut into ½-inch squares and defibered in a Waring Blendor for two minutes. This was added to 97 grams of N-methylpiperidine-N-oxide in the apparatus described in Example 5 at 90° C. A clear, viscous dope resulted which was diluted with 100 grams of dimethyl sulfoxide and while hot was filtered through a sintered disc Buchner funnel. Part of the filtrate was then precipitated into methanol-acetone (1:1) to give a white fibrous solid, cellulose. The other part of the filtrate was coated as a film on a glass plate and extracted with methanol-acetone (1:1) to remove the residual amine oxide to give a tough, transparent film.

Example 7.—Solution of filter paper

One 18.5 cm. circle of Whatman #4 paper (3 grams) was defibered in a Waring Blendor for two minutes, and then added to 97 grams of N-methylpyrrolidine-N-oxide thermostated in an oil bath at 100° C. This mixture was mechanically stirred for one hour to give a clear dope.

Twenty milliliters of this dope was diluted with an equal volume of 1,4-oxathiane-4-oxide and cast into a smooth film on glass. The solvent was removed in boiling methanol and the film dried to a tough transparent film. By extracting some of the diluted dope into methanol through a 26-gauge needle in a syringe, strong monofilament fibers were made.

Example 8

The procedure of Example 7 was repeated using N-methylazacycloheptane-N-oxide instead of N-methylpyrrolidine-N-oxide. Similar results are obtained.

Example 9

Following is a table illustrating a great number of compounds which are dissolved by the amine oxides of the invention.

TABLE I.—SOLUBILITY OF VARIOUS NATURAL AND SYNTHETIC COMPOUNDS

| | | | |
|---|---|---|---|
| A | B | C | D |

| Polymer | Weight of Polymer (g.) | Solvent | Weight of Solvent (g.) | Solution Temperature (° C.) |
|---|---|---|---|---|
| Wool | 0.5 | A | 5 | 150 |
| | 0.2 | D | 5 | 125 |
| Silk | 0.1 | A | 5 | 120 |
| | 0.2 | D | 5 | 140 |
| Nylon | 0.1 | A | 5 | 160 |
| | 0.2 | D | 5 | 130 |
| Hair (human) | 0.1 | A | 5 | 150 |
| | 0.25 | D | 5 | 150 |
| Feathers | 0.2 | A | 5 | 150 |
| | 0.2 | D | 5 | 145 |
| Poly(vinyl alcohol) | 0.5 | A | 5 | 130 |
| | 0.5 | B | 5 | 120 |
| | 0.5 | C | 5 | 120 |
| Poly(ethylene oxide) | 5.0 | A | 5 | 100 |
| Starch (soluble) | 2.0 | A | 5 | 130 |
| β-Amylose | 0.5 | A | 5 | 130 |
| | 0.5 | B | 5 | 130 |
| Sugar | 2.0 | A | 5 | 130 |
| D-(+)-Mannose | 0.5 | C | 5 | 100 |
| D-Glucose | 0.5 | B | 5 | 100 |
| Poly(vinylpyrrolidone) | 0.2 | A | 5 | 110 |
| Casein | 0.2 | A | 5 | 120 |
| Zein (corn) | 0.2 | A | 5 | 130 |
| Poly(vinyl acetate) | 0.2 | A | 5 | 120 |
| Sorbitol | 5.0 | A | 5 | 110 |
| Carboxymethyl hydroxyethyl cellulose | 0.2 | A | 5 | 130 |
| Cellulose diacetate | 0.1 | A | 5 | 130 |
| Cellulose monoacetate | 0.5 | A | 5 | 110 |
| Gelatin | 0.3 | A | 5 | 110 |
| N-Methyl glucamine | 5.0 | A | 5 | 100 |
| Gum Arabic | 0.2 | A | 5 | 140 |
| Cyanoethyl sucrose | 2.0 | A | 5 | 100 |
| | 2.0 | B | 5 | 100 |
| Copoly(vinyloxymethylmorpholinium PTS) (vinyl acetate) | 0.5 | A | 5 | 140 |
| Cellobiose | 0.5 | A | 5 | 120 |
| | 0.5 | C | 5 | 120 |
| Cellulose acetate butyrate | 0.1 | C | 5 | 120 |
| Glycogen | 0.5 | A | 5 | 120 |
| Polyethylene terephthalate | 0.5 | A | 5 | 160 |
| Poly(acrylonitrile) | 0.1 | A | 5 | 160 |
| Lignin | 0.1 | A | 10 | 160 |
| Polyethylene | 1.0 | C | 5 | 110 |
| Poly(anhydroglucose) | 0.5 | A | 5 | 110 |
| Cellulose | 0.3 | A | 5 | 90 |
| | 0.15 | B | 5 | 100 |
| | 0.15 | C | 5 | 100 |
| | 0.25 | D | 5 | 100 |

Example 10

Following is a table illustrating the solubility of cellulose in the amine oxides of the invention compared to closely related amine oxides.

TABLE II.—COMPARATIVE SOLUBILITY OF CELLULOSE IN VARIOUS TERTIARY AMINE OXIDES

| Solvents for Cellulose—Cyclic Amine Oxides of the Invention | Non-Solvents for Cellulose— Closely Related Amine Oxides |
|---|---|
| N-methylmorpholine-N-oxide | N-ethylmorpholine-N-oxide |
| N-methylpiperidine-N-oxide | N,N'-dimethylpiperazine-N,N'-dioxide |
| N-methylazacycloheptane-N-oxide | Quinuclidinol-N-oxide |
| N-methylpyrrolidine-N-oxide | 1,4-diazabicyclo[2.2.2]octane-1,4-dioxide |
|  | $(C_2H_5)_3N \longrightarrow O$ Triethylamine oxide |

The above table shows that cellulose is unexpectedly soluble in saturated, cyclic, N-methyl, amine N-oxides, while it is insoluble in the closely related N-ethyl substituted amine oxides, di-(amine oxides), and non-cyclic tertiary amine oxides.

Example 11.—Preparation of cellulose acetate

Three grams of Whatman #4 filter paper was dissolved in 100 grams of N-methylpiperidine-N-oxide, heated to 100° C. and diluted with 100 ml. of dimethyl sulfoxide. To this solution, 100 ml. of ethylene diacetate was added in 10 ml. portions over five minutes. Stirring and heating were continued for two hours. This clear dope was precipitated into two liters of acetone to give a white, fibrous precipitate which was triturated three times with one liter of methanol, washed with one liter of acetone, and dried. Three grams of a white, powdery polymer, cellulose acetate, was produced. This compound was found to have a strong absorption in the carbonyl region (1720 cm.$^{-1}$) in the infrared and to be soluble in water. When the aqueous solution was treated with sodium hydroxide, a precipitate was formed which was not soluble in dilute hydrochloric acid. This confirmed that cellulose acetate was formed in the reaction. Sodium hydroxide hydrolyzed the cellulose acetate back to the insoluble cellulose.

Example 12.—Preparation of higher cellulose esters

Three grams of cotton linters were dissolved in 100 grams of N-methylmorpholine-N-oxide at 95° C. and diluted with 100 ml. of dimethyl sulfoxide. To this solution was added 100 ml. of methyl butyrate and the temperature of the solution was gradually raised to 135° C. with distillation of an azeotrope. After six hours, the clear solution was poured into two liters of acetone to precipitate a white fibrous precipitate. This precipitate was collected and triturated two times with 500 ml. of methanol and dried. Its infrared spectrum indicated a carbonyl absorption of 1720 cm.$^{-1}$. Elemental analysis indicated a 2.1 percent butyryl content. The white, powdery, partially butyrated cellulose is soluble in dimethyl sulfoxide, from which thin films may be cast.

Example 13

Following the procedure of Example 12, 100 ml. of ethyl propionate was reacted with 3 grams of cotton linters to give a white, powdery cellulose propionate (3 grams).

Example 14.—Preparation of cyanoethyl cellulose

Six grams of Whatman #4 filter paper was dissolved in 100 grams of N-methylmorpholine-N-oxide at 105° C. and diluted with 200 ml. of dimethyl sulfoxide. To this solution was added 100 ml. of acrylonitrile and heating and stirring were continued for one hour. A dark red color developed during this time. This viscous, transparent solution was poured into three liters of acetone to precipitate a white, fibrous polymeric solid. This solid was triturated three times with one liter of methanol, then washed with one liter of acetone, and dried in a vacuum dessicator to give 6.5 grams of partially cyanoethylated cellulose. The infrared spectrum of this compound showed a strong —OH absorption at 3400 cm.$^{-1}$ and a good —CN absorption at 2250 cm.$^{-1}$. This polymer was highly swollen by water, and is soluble in dimethyl sulfoxide from which clear films may be cast.

Example 15

Following the procedure of Example 14 with the addition of 2 ml. of a 20 percent benzyl trimethylammonium hydroxide solution prior to the addition of the acrylonitrile, a water-soluble cyanoethyl cellulose is prepared.

Example 16.—Preparation of cellulose oxyethylmethylketone

Twelve grams of cotton linters were dissolved in 300 grams of N-methylmorpholine-N-oxide at 100° C. To this solution was added 100 ml. of dimethyl sulfoxide followed by 100 ml. of methyl vinyl ketone. This dope was stirred for one hour and a red color developed. The solution was filtered through a Dannley funnel and precipitated into a mixture of 2 liters of methanol and 5 liters of acetone to give a colored fibrous product. This was washed five times with 2 liters of methanol while stirring vigorously to remove the color. The product was a very strong, light brown cellulose oxyethylmethylketone.

Example 17.—Amine oxides as adhesives

Two sheets of Whatman #4 filter paper were treated with a solution of 75 percent N-methylmorpholine-N-oxide in methanol. These two sheets were pressed into close contact and heated at 120° C. for two minutes. The two sheets fused together and, after washing in water to remove the amine oxide, could not be separated.

Example 18

A slurry of 5 grams of N-methylmorpholine-N-oxide, 5 grams of methanol, and 5 grams of sand which passes through a 50 mesh screen was coated on Whatman #4 filter paper. The sheet was heated at 120° C., then washed in methanol to give a very strong sandpaper. The abrasive was not removed in water.

Example 19

This example illustrates the strengthening of paper by partial acetylation of cellulose in sheet form.

A solution was prepared from 50 grams of N-methylmorpholine-N-oxide, 50 ml. of dimethyl sulfoxide, and 50 ml. of ethylene diacetate and heated in a shallow tray at 120° C. Into this solution was placed a sheet of Whatman #4 filter paper for ten seconds. The paper was then removed from the solution, heated to dryness over a hot air stream, washed in water, washed in methanol, and then washed in acetone and dried. The infrared spectrum of the paper showed a carbonyl absorption at 1720 cm.$^{-1}$. The paper had the following burst strengths (p.s.i.— Minden):

|  | Untreated | Treated |
|---|---|---|
| Wet | 0 | 58 |
| Dry | 12 | 95 |

To the compositions comprising a compound dissolved in an amine oxide of this invention may be added pigments, plasticizers, surfactants, auxiliary solvents, stabilizers, photoreagents, or such other addenda as will improve the properties, uses, or applicability of the solution.

Although the invention has been described in considerable detail with reference to certain preferred embodiments thereof, variations and modifications can be effected within the spirit and scope of the invention as described hereinbefore and as defined in the appended claims.

I claim:
1. A composition comprising a natural or synthetic polymeric compound characterized by intermolecular hydrogen bonding dissolved in a cyclic mono(N-methylamine-N-oxide) having the following formula:

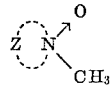

where Z represents the atoms required to complete a saturated heterocyclic ring, said natural or hynthetic polymeric compound being present in an amount of up to about 70% by weight of the solution.

2. The composition of claim 1 wherein said polymeric compound is a natural organic compound having high molecular weight.

3. The composition of claim 2 wherein said polymeric compound is wool, silk, hair, feathers, casein, zein, gelatin, gum arabic, dignin or cellulose.

4. The composition of claim 1 wherein said solvent is N-methylmorpholine-N-oxide.

5. The composition of claim 1 wherein said solvent is N-methylpiperidine-N-oxide.

6. The composition of claim 1 wherein said solvent is N-methylpyrrolidine-N-oxide.

7. The composition of claim 1 wherein said solvent is N-methylazacycloheptane-N-oxide.

8. The composition of claim 1 wherein said polymer is wool, silk, hair, feathers, β-amylose, casein, zein, gelatin, gum arabic, or lignin.

9. The composition of claim 1 wherein said synthetic polymeric compound is nylon.

10. A process comprising dissolving in a cyclic mono (N-methylamine-N-oxide, a natural or synthetic polymeric compound characterized by intermolecular hydrogen bonding in an amount of up to about 70% by weight of the solution, said cyclic mono(N-methylamine-N-oxide) having the following formula:

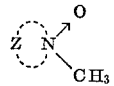

where Z represents the atoms required to complete a saturated heterocyclic ring.

11. The process of claim 10 wherein said solvent is N-methylmorpholine-N-oxide.

12. The process of claim 10 wherein said solvent is N-methylpiperidine-N-oxide.

13. The process of claim 10 wherein said solvent is N-methylpyrrolidine-N-oxide.

14. The process of claim 10 wherein said solvent is N-methylazacycloheptane-N-oxide.

15. The process of claim 10 wherein said polymeric compound is wool, silk, hair, feathers, β-amylose, casein, zein, gelatin, gum arabic, or lignin.

16. The process of claim 10 wherein said polymeric compound is nylon.

17. The process of claim 10 wherein said compound is a cellulosic compound.

18. The process of claim 17 wherein said compound after being dissolved is then esterified by adding a chemical esterification reagent to said solution.

19. The process of claim 18 wherein said compound is cellulose and wherein the esterification is an ester interchange reaction.

20. Solution of a high molecular weight organic compound characterized by intermolecular hydrogen bonding containing up to 70% by weight of said compound in N-methylmorpholine-N-oxide, N-methylpiperidine-N-oxide, N-methylpyrrolidine-N-oxide or N-methylazacycloheptane-N-oxide.

21. A solution according to claim 20 wherein said high molecular weight compound is wool, silk, hair, feathers, β-amylose, casein, zein, gelatin, gum arabic, cellulose, lignin or nylon.

References Cited

UNITED STATES PATENTS

| | | | |
|---|---|---|---|
| 2,179,181 | 11/1939 | Graenacher et al. | 106—163 |
| 3,253,058 | 5/1966 | Isley et al. | 260—30.2 |

ALLAN LIEBERMAN, *Primary Examiner.*

U.S. Cl. X.R.

106—146, 153, 155, 161, 162, 176, 203, 208, 213, 236, 311; 260—30.2, 30.4, 124, 214, 231

PO-1050
(5/69)

UNITED STATES PATENT OFFICE
CERTIFICATE OF CORRECTION

Patent No. 3,447,939          Dated June 3, 1969

Inventor(s) Dee Lynn Johnson

It is certified that error appears in the above-identified patent and that said Letters Patent are hereby corrected as shown below:

In column 1, columnar line 16, "composition" should read ---compositions---. In column 2, columnar line 55, "patrial" should read ---partial---. In column 3, columnar line 21, after "and" should be inserted ---quinuclidinol-N-oxide, which are all encompassed by---. In column 5, columnar line 52, "accurred" should read ---occurred---. In column 8, columnar line 8, "of" should read ---at---. In column 9, columnar line 38, "hynthetic" should read ---synthetic---; columnar line 46, "dignin" should read ---lignin.

SIGNED AND
SEALED
MAR 10 1970

(SEAL)
Attest:

Edward M. Fletcher, Jr.
Attesting Officer

WILLIAM E. SCHUYLER, JR.
Commissioner of Patents